Sept. 13, 1960 P. H. ALLEN 2,952,419

TAPE AND ROLLER HOLDER

Filed Aug. 16, 1954

INVENTOR.

Philip H. Allen

United States Patent Office 2,952,419
Patented Sept. 13, 1960

2,952,419

TAPE AND ROLLER HOLDER

Philip H. Allen, Los Gatos, Calif., assignor, by mesne assignments, to Cycle Equipment Company, Los Gatos, Calif., a corporation of Nevada Filed Aug. 16, 1954, Ser. No. 450,120

5 Claims. (Cl. 242—76)

The present invention relates to the handling of tape, such as the perforated tape employed in Teletype operations, and is concerned more particularly with an improved tape and roller holder for facilitating handling of the tape and to effect certain economies in manufacture, assembly and servicing of tape handling machines.

In accordance with the instant invention, a tape and roller holder is provided which maintains a tape handling roller in place on its shaft, which can be manually adjusted to any desired angle or position about the shaft, which requires no special machining of the shaft or roller, and which enables picking up of tape from an out-of-line position with the roller and feeding it into the tape handling machine.

The above and other objects of the invention are attained as described in connection with a preferred embodiment of the invention, as illustrated in the accompanying drawings, in which.

Figure 1:
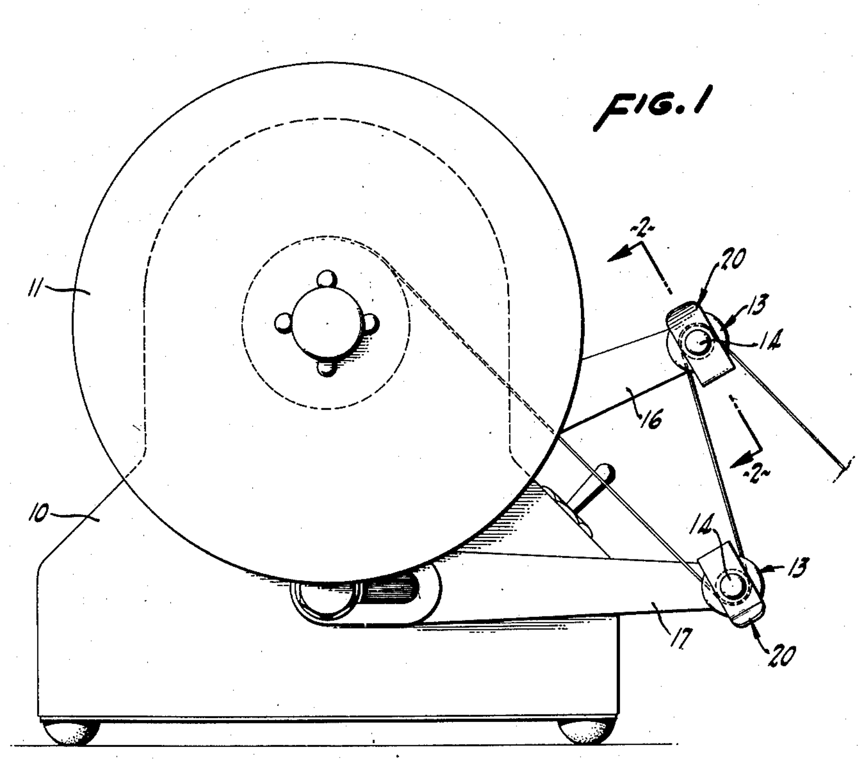
Figure 1 is an elevational view of a tape winder employing the instant invention.
Figure 2:
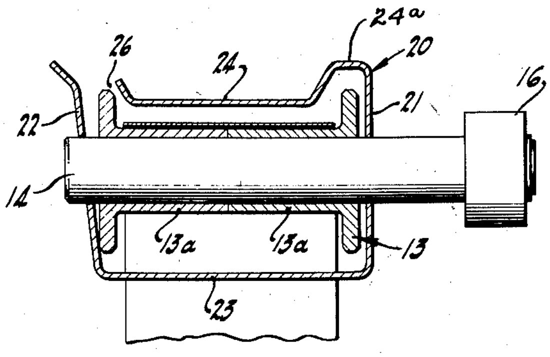
Figure 2 is a transverse sectional view taken in a plane indicated by the line 2—2 in Figure 1.

Referring to the drawings, the tape winder is of the type shown and described in the copending application of Patrick M. Miles, Serial No. 132,173, filed December 9, 1949, for Tape Winding Machine, now Patent No. 2,700,513. This machine includes a body 10, which houses a motor for intermittently driving a tape winding reel 11. The tape winding reel 11 receives tape which is trained over respective rollers 13, which are constructed in the instant case, as identical roller halves 13*a* or sectional rollers to facilitate machining operations. These rollers 13 are journalled on respective shafts 14, carried by an upper movable arm 16 and a lower arm 17, and these rollers serve to properly align the tape with respect to the reel 11. The shafts 14 are sufficiently long to receive a tape retaining member or holder 20 of thin resilient material, including two end portions 21 and 22 which are perforated to engage over the associated shaft 14, and which are disposed at an angle to each other, a connecting bottom portion 23 extending between the end portions 21 and 22, and a top portion 24 connected to the end portion 22 by a U-shaped roller flange overlapping portion 24*a*. The top portion 24 is spaced at its far end from the end portion 21 to provide an opening 26 by means of which the tape can be inserted and withdrawn.

Because the end portions 21 and 22 are non-parallel, when placed over a shaft 14, they exert a binding action on the shaft so that the holder 20 remains in place.

The holder 20 and the roller 13 can be installed on the shaft simply by bending the inclined end portion 22 of the holder into alignment with the portion 21. The resilient gripping of the holder 20 permits adjustment of the holder or retainer around the shaft into desired alignment with the tape irrespective of whether it is being received from above or below, and provides an easy method for removal of a roller, either during servicing or because of the desired replacement of a part.

When tape is to be picked up from an out of line position with the reel, for example from a loose pile on the floor, the holder can be positioned with the end portion 22 adjacent the pile of tape, and the tape inserted underneath the top portion or tape retainer finger 24, and then the tape will be picked up and passed over the roller, and then over the second roller and then on to the winding reel. If desired, and where the tape is suitable, the roller 13 may be omitted and the tape passed directly over the shaft 14 and guided by the retainer 20.

While I have shown and described a preferred embodiment of the invention, it will be apparent that the invention is capable of variation and modification from the form shown so that its scope should be limited only by the scope of the claims appended hereto.

I claim:

1. In a tape handling machine, a roller assembly comprising a mounting shaft, a roller journaled on the mounting shaft, and a resilient roller retainer having four sides and encompassing said roller and including opposite apertured end portions disposed at an angle to each other, a connecting portion between said end portions, and a tape retaining finger projecting from one of said end portions toward the other end portion, said tape retaining finger being arched over said roller substantially to prevent the tape from accidentally leaving said roller.

2. In a tape handling machine a roller assembly comprising a shaft and a roller journalled thereon, a resilient retainer for said roller having flanges, said retainer being composed of four sides and including opposite apertured end portions disposed at an angle to each other, a connecting portion between said end portions, and a tape retaining finger projecting from one of said end portions, said tape retaining finger having a U-shaped portion overlapping a flange of said roller on either side of said flange.

3. In a tape handling machine, a shaft, a roller journaled on the shaft and including flanges, a retainer including a portion for radially overlapping at least one flange of said roller on both sides of said one flange, and two opposed side portions disposed at an angle to each other, said side portions being apertured to engage over the shaft upon which the roller is supported and said portions being movable to parallel relation for placement on said shaft, and serving when in a non-parallel position to grip the shaft to maintain the roller in its located position thereon.

4. In a tape handling machine, a shaft, a roller journaled on the shaft and including flanges, a retainer including a portion for radially overlapping at least one flange of said roller on both sides of said one flange, and said retainer also including means for releasably engaging said shaft adjacent at least one end of the roller to provide a stop therefor.

5. In tape handling equipment, a shaft about which tape is to be passed, a resilient tape retainer structure comprising means yieldably gripping said shaft to hold said retainer structure releasably on said shaft, said structure also including a pair of spaced-apart upstanding parts for gripping by the operator to effect release of said yieldable gripping means, and said structure also including a longitudinal tape retaining part extending parallel to said shaft in spaced relation therefrom, said tape retainer structure upon gripping of said upstanding parts being adapted for rotatable positioning with reference to the shaft or for longitudinal movement along said shaft.

References Cited in the file of this patent

UNITED STATES PATENTS

| | | |
|---|---|---|
| 860,816 | Marcum | July 23, 1907 |
| 1,220,185 | Cathcart | May 27, 1917 |
| 1,505,220 | Shay | Aug. 19, 1924 |
| 2,216,886 | Langelier | Oct. 8, 1940 |
| 2,438,286 | Huber | Mar. 23, 1948 |
| 2,578,123 | Bendfelt | Dec. 11, 1951 |
| 2,638,365 | Jones | May 12, 1953 |

FOREIGN PATENTS

| | | |
|---|---|---|
| 319,880 | Great Britain | Oct. 3, 1929 |